(12) United States Patent
Krumanaker et al.

(10) Patent No.: US 10,208,605 B2
(45) Date of Patent: Feb. 19, 2019

(54) TURBINE BLADE

(71) Applicant: General Electric Company, Schenectady, NY (US)

(72) Inventors: Matthew Lee Krumanaker, Blue Ash, OH (US); Steven Robert Brassfield, Cincinnati, OH (US); Robert Frederick Bergholz, Loveland, OH (US); Aaron Ezekiel Smith, Montgomery, OH (US); Weston Nolan Dooley, West Chester, OH (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 14/884,009

(22) Filed: Oct. 15, 2015

(65) Prior Publication Data

US 2017/0107824 A1  Apr. 20, 2017

(51) Int. Cl.
*F01D 5/18* (2006.01)
*F01D 25/12* (2006.01)
(Continued)

(52) U.S. Cl.
CPC .............. *F01D 5/187* (2013.01); *F01D 5/147* (2013.01); *F01D 5/18* (2013.01); *F01D 9/041* (2013.01);
(Continued)

(58) Field of Classification Search
CPC . F01D 5/18; F01D 5/186; F01D 5/187; F01D 5/188; F01D 5/189; F01D 5/147; F01D 25/12; F05D 2240/303; F05D 2240/305; F05D 2240/306; F05D 2250/185; F05D 2260/201; F05D 2260/202; F05D 2220/32
See application file for complete search history.

(56) References Cited

U.S. PATENT DOCUMENTS 3,527,543 A   9/1970   Werner
3,864,058 A   2/1975   Womack
(Continued)

FOREIGN PATENT DOCUMENTS

EP   1630354 A2   3/2006
EP   2835501 A1   2/2015
(Continued)

OTHER PUBLICATIONS

European Search Report and Written Opinion issued in connection with related European Application No. 16193545.7 dated Feb. 15, 2017.
(Continued)

*Primary Examiner* — Justin Seabe
*Assistant Examiner* — Brian P Wolcott
(74) *Attorney, Agent, or Firm* — General Electric Company; William Andes (57) ABSTRACT

A turbine engine comprises an airfoil having one or more internal cooling circuits. The cooling circuits can be fed with a flow of cooling fluid from one or more cooling air inlet passages in fluid communication with the cooling circuits. The cooling circuits can provide the cooling fluid flow within the airfoil to cool the airfoil, as well as provide a cooling fluid to a plurality of film holes to create a cooling film on the external surface of the airfoil.

21 Claims, 5 Drawing Sheets

(51) Int. Cl.
*F01D 5/14* (2006.01)
*F01D 9/04* (2006.01)
*F04D 29/32* (2006.01)
*F04D 29/54* (2006.01)
*F04D 29/58* (2006.01)

(52) U.S. Cl.
CPC ............ *F01D 25/12* (2013.01); *F04D 29/324* (2013.01); *F04D 29/542* (2013.01); *F04D 29/582* (2013.01); *F05D 2220/32* (2013.01); *F05D 2240/303* (2013.01); *F05D 2240/305* (2013.01); *F05D 2240/306* (2013.01); *F05D 2250/185* (2013.01); *F05D 2260/201* (2013.01); *F05D 2260/202* (2013.01); *Y02T 50/676* (2013.01)

(56) References Cited

U.S. PATENT DOCUMENTS

| | | | |
|---|---|---|---|
| 4,416,585 A | 11/1983 | Abdel-Messeh | |
| 4,669,957 A | 6/1987 | Phillips et al. | |
| 5,156,526 A | 10/1992 | Lee et al. | |
| 5,165,852 A | 11/1992 | Lee et al. | |
| 5,223,320 A | 6/1993 | Richardson | |
| 5,356,265 A | 10/1994 | Kercher | |
| 5,392,515 A | 2/1995 | Auxier et al. | |
| 5,405,242 A | 4/1995 | Auxier et al. | |
| 5,660,524 A | 8/1997 | Lee et al. | |
| 5,660,525 A | 8/1997 | Lee et al. | |
| 5,690,472 A | 11/1997 | Lee | |
| 5,690,473 A | 11/1997 | Kercher | |
| 5,931,638 A | 8/1999 | Krause et al. | |
| 6,164,912 A | 12/2000 | Tabbita et al. | |
| 6,234,755 B1 | 5/2001 | Bunker et al. | |
| 6,257,831 B1 | 7/2001 | Papple et al. | |
| 6,832,889 B1 | 12/2004 | Lee et al. | |
| 6,955,522 B2 | 10/2005 | Cunha et al. | |
| 6,969,230 B2 | 11/2005 | Shi et al. | |
| 6,974,308 B2 | 12/2005 | Halfmann et al. | |
| 7,011,502 B2 | 3/2006 | Lee et al. | |
| 7,296,973 B2 | 11/2007 | Lee et al. | |
| 7,300,250 B2 | 11/2007 | Papple | |
| 7,520,725 B1* | 4/2009 | Liang | F01D 5/186 416/97 R |
| 7,625,178 B2 | 12/2009 | Morris et al. | |
| 7,690,893 B2 | 4/2010 | Cunha | |
| 7,841,828 B2 | 11/2010 | Liang | |
| 7,901,183 B1 | 3/2011 | Liang | |
| 7,980,819 B2 | 7/2011 | Albert et al. | |
| 8,057,182 B2 | 11/2011 | Brittingham et al. | |
| 8,092,175 B2 | 1/2012 | Beeck et al. | |
| 8,177,506 B2 | 5/2012 | Cunha et al. | |
| 8,292,582 B1 | 10/2012 | Liang | |
| 8,628,298 B1 | 1/2014 | Liang | |
| 8,764,394 B2 | 7/2014 | Lee et al. | |
| 2005/0111977 A1 | 5/2005 | Lee et al. | |
| 2005/0169752 A1* | 8/2005 | Lee | F01D 5/187 416/97 R |
| 2005/0232769 A1 | 10/2005 | Lee et al. | |
| 2006/0034690 A1 | 2/2006 | Papple et al. | |
| 2006/0093480 A1 | 5/2006 | Cunha et al. | |
| 2014/0031275 A1 | 1/2014 | Lewis et al. | |
| 2014/0033736 A1 | 2/2014 | Propheter-Hinckley et al. | |
| 2015/0044029 A1* | 2/2015 | Tibbott | F01D 5/18 415/115 |
| 2017/0107825 A1 | 4/2017 | Krumanaker et al. | |
| 2017/0107827 A1 | 4/2017 | Krumanaker et al. | |

FOREIGN PATENT DOCUMENTS

| | | |
|---|---|---|
| EP | 3124746 A1 | 2/2017 |
| WO | 2014031275 A1 | 2/2014 |
| WO | 2014055259 A1 | 4/2014 |
| WO | 2015123006 A1 | 8/2015 |

OTHER PUBLICATIONS

European Search Report and Written Opinion issued in connection with related European Application No. 16191836.2 dated Feb. 22, 2017.

European Search Report and Written Opinion issued in connection with related European Application No. 16193559.8 dated Mar. 1, 2017.

GE related case form.

European Search Report and Opinion issued in connection with corresponding EP Application No. 16193546.5 dated Feb. 15, 2017.

* cited by examiner

TURBINE BLADE

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

The invention relates to an airfoil for a gas turbine engine having an outer surface defining a pressure side and a suction side extending axially between a leading edge and a trailing edge and extending radially between a root and a tip with the root being adjacent the dovetail. The airfoil further comprises a leading edge cooling circuit located within the airfoil and further comprising: a supply passage extending from the root to the tip and fluidly coupled to the dovetail inlet passage at the root, a near wall cooling circuit located along the outer surface and having a plenum passage fluidly coupled to the supply passage and extending from the tip toward the root and at least one return passage extending from the root toward the tip and fluidly coupled to the plenum passage, and a leading edge passage adjacent the leading edge, extending in a root to tip direction and fluidly coupled to the supply passage. Cooling air is supplied through the inlet passage to the supply passage, where it flows into the plenum passage and the leading edge passage, and cooling fluid from the plenum passage flows into the return passage.

In another aspect, the invention relates to a blade for a gas turbine having a turbine rotor disk. The blade comprises a dovetail having at least one cooling air inlet passage and configured to mount to the turbine rotor disk and an airfoil extending radially from the dovetail and having an outer surface defining a pressure side and a suction side extending axially between a leading edge and a trailing edge, and extends radially between a root and a tip, with the root being adjacent the dovetail. The blade also comprises a leading edge cooling circuit located within the airfoil, comprising: a supply passage extending from the root toward the tip and fluidly coupled to the dovetail inlet passage at the root; a near wall cooling circuit located along the outer surface and having a plenum passage fluidly coupled to the supply passage, extending from the tip toward the root, a first return passage extending from the root toward the tip and fluidly coupled to the plenum passage, with the plenum passage located between the first and second return passages; and a leading edge passage adjacent the leading edge, extending in a root to tip direction and fluidly coupled to the supply passage. Cooling air is supplied through the inlet passage to the supply passage, where it flows into the plenum passage and the leading edge passage, and cooling fluid from the plenum passage flows into the first and second return passages.

In another aspect of the invention, an airfoil for a gas turbine engine having a turbine rotor disk comprising an outer surface extending axially between a leading edge and a trailing edge and extending radially between a root and a tip, and a leading edge cooling circuit located within the airfoil adjacent the leading edge and comprising a supply passage extending from the root toward the tip. A near wall cooling circuit is located along the outer surface between the outer surface and the supply passage. The near wall cooling circuit has a plenum passage fluidly coupled to the supply passage and extends from the tip toward the root and has at least one return passage extending form the root toward the tip being fluidly coupled to the plenum passage. A leading edge passage is adjacent the leading edge, extending in a root to tip direction and fluidly coupled to the supply passage, wherein the cooling air is supplied through the supply passage where it flows into the plenum passage and the leading edge passage, and cooling fluid from the plenum passage flows into the return passage.

DESCRIPTION OF EMBODIMENTS OF THE INVENTION

The described embodiments of the present invention are directed to a turbine blade, and in particular to cooling a turbine blade. For purposes of illustration, the present invention will be described with respect to a turbine blade for an aircraft gas turbine engine. It will be understood, however, that the invention is not so limited and may have general applicability in non-aircraft applications, such as other mobile applications and non-mobile industrial, commercial, and residential applications. It can also have application to airfoils, other than a blade, in a turbine engine, such as stationary vanes.

Figure 1:
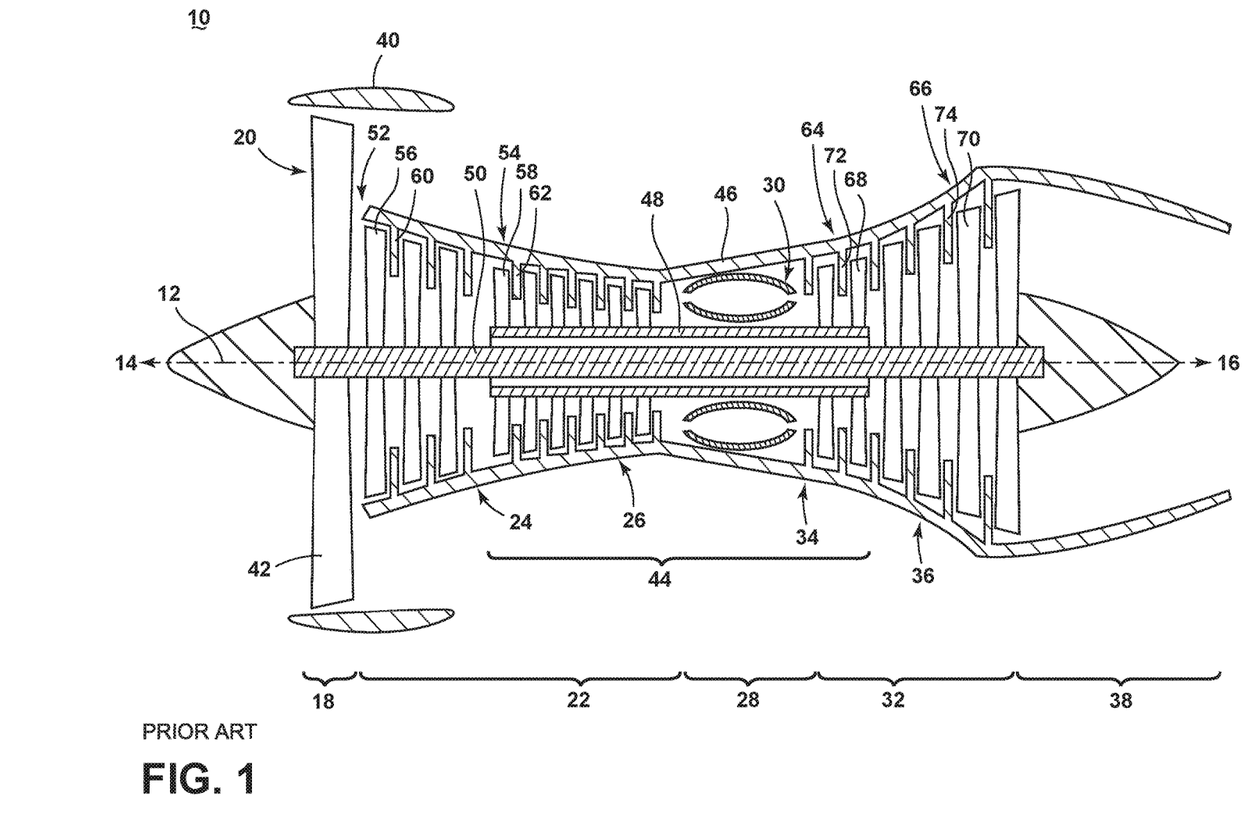
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of airfoils in the form of fan blades 42 disposed radially about the centerline 12. The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of airfoils in the form of compressor blades 56, 58 rotate relative to a corresponding set of static airfoils in the form of compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of rotating airfoils in the form of turbine blades 68, 70 that are rotated relative to a corresponding set of static airfoils in the form of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
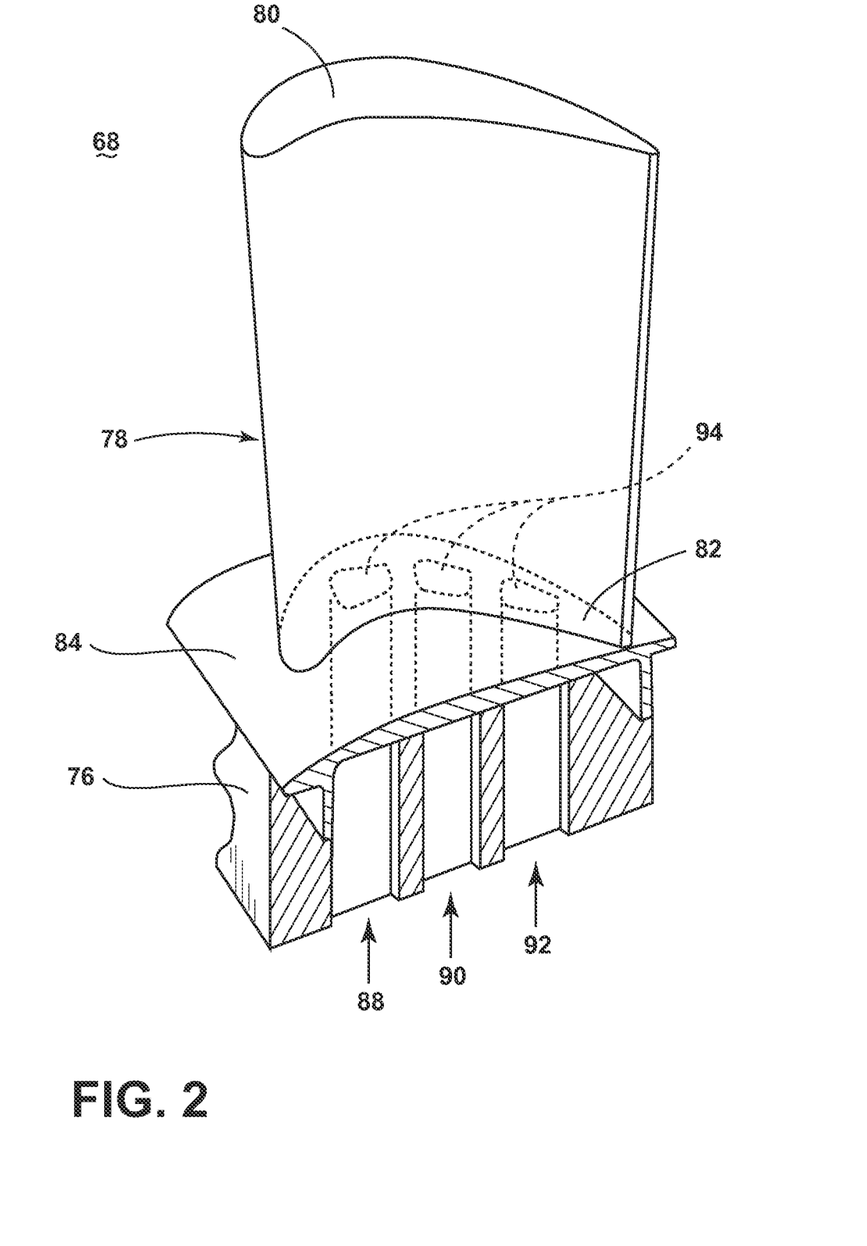
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 76 and an airfoil 78. The airfoil 78 extends from a tip 80 to a root 82. The dovetail 76 further includes a platform 84 being integral with the airfoil 78 at the root 82, which helps to radially contain the turbine air flow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
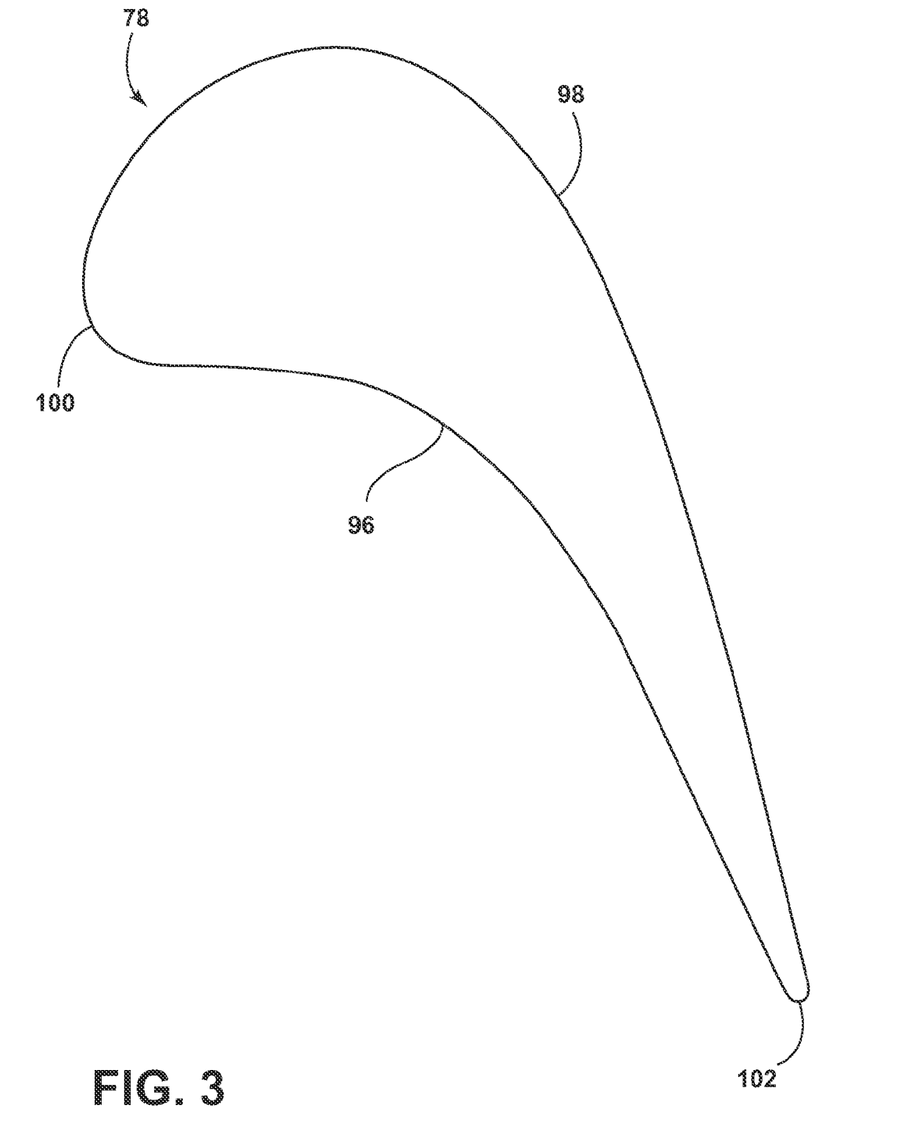
FIG. 3 is a cross-sectional view of the airfoil of FIG. 2.

Turning to FIG. 3, the airfoil 78, shown in cross-section, has a concave-shaped pressure sidewall 96 and a convex-shaped suction sidewall 98 which are joined together to define an airfoil shape with a leading edge 100 and a trailing edge 102. The blade 68 rotates in a direction such that the pressure sidewall 96 follows the suction sidewall 98. Thus, as shown in FIG. 3, the airfoil 78 would rotate upward toward the top of the page.

Figure 4:
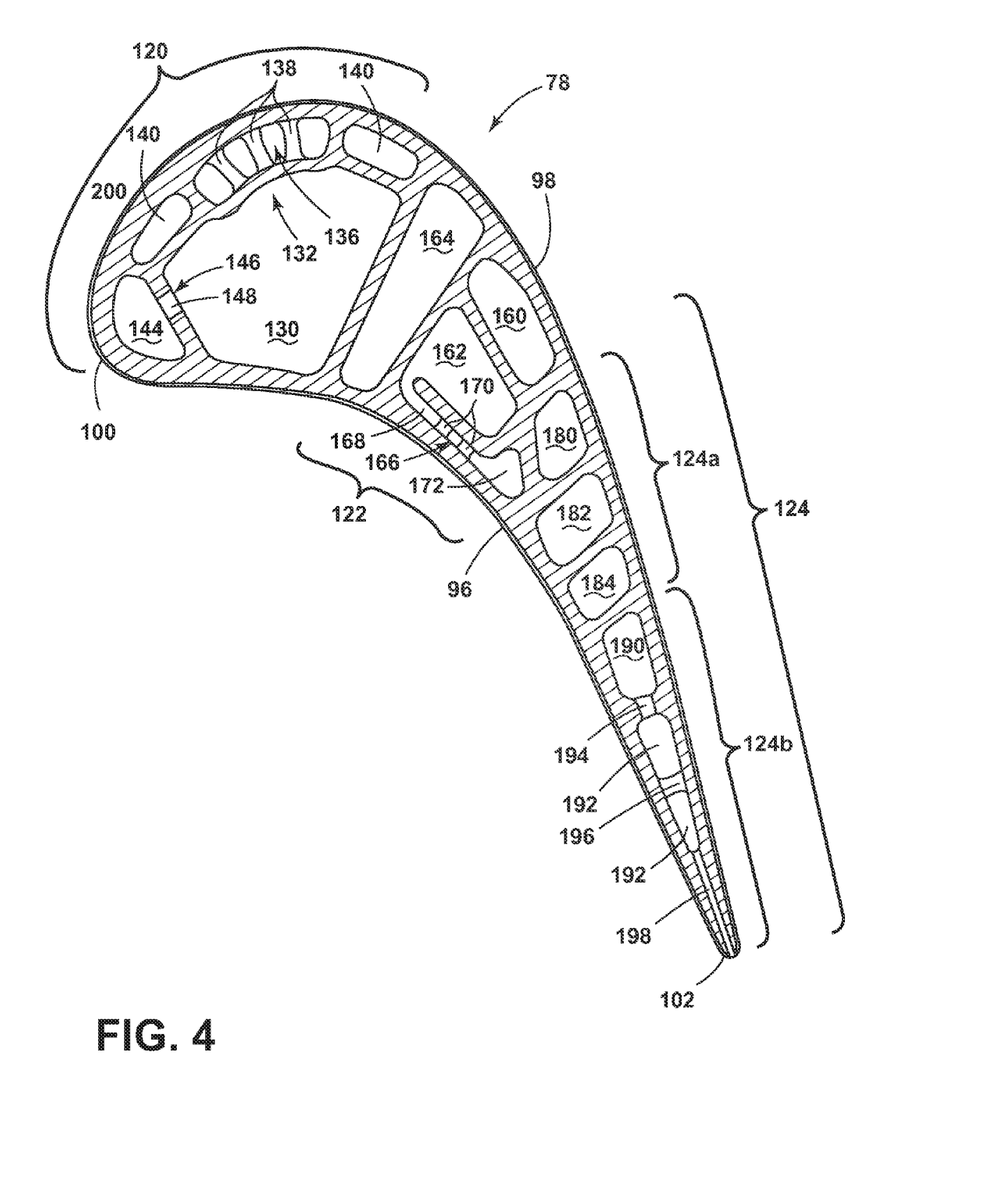
FIG. 4 is a diagram of the cross-sectional airfoil of FIG. 3 illustrating four cooling circuits disposed within the airfoil.

The airfoil 78 comprises a plurality of internal passages which can be arranged to form cooling circuits dedicated to cool a particular portion of the blade. The passages and the corresponding cooling circuits are illustrated in FIG. 4, which is a cross-sectional view of the airfoil 78. It should be appreciated that the respective geometries of each individual passage within the airfoil 78 as shown is exemplary, each depicting one or more elements of a cooling circuit and should not limit the cooling circuits to the geometries, dimensions, or positions as shown.

As illustrated, the airfoil 78 is provided with three cooling circuits, a leading edge cooling circuit 120, a mid cooling circuit 122, and a trailing edge cooling circuit 124, which are supplied cooling air via the inlet passages 88, 90, 92, respectively, passing through the dovetail 76. The trailing edge cooling circuit 124, as illustrated, further comprises a first cooling circuit 124a and a second cooling circuit 124b, commonly fed from the third inlet passage 92.

The cooling circuits can be defined by one or more passages extending radially within the airfoil 78. It should be appreciated that the passages can comprise one or more film holes which can provide fluid communication between the particular passage and the external surface of the airfoil 78, providing a film of cooling fluid along the external surface of the airfoil 78.

Looking in greater detail at each of the cooling circuits, the first or leading edge cooling circuit 120 can comprise a supply passage 130, near wall cooling circuit 132, and leading edge cooling passage 144. The supply passage 130 extends from the root 82 toward the tip 80, being fluidly coupled to the first inlet passage 88 at the outlet 94 to supply the cooling air to the near wall cooling circuit 132 and leading edge passage 144.

The near wall cooling circuit 132 is exemplarily illustrated between the supply passage 130 and the suction sidewall 98, while being adjacent to the suction sidewall 98. In this configuration, the near wall cooling circuit 132 cools the wall portion of the airfoil along the suction sidewall 98. Alternatively, the near wall cooling circuit 132 can be positioned adjacent to the pressure sidewall 96, between the pressure sidewall 96 and the supply passage 130. Similarly, the supply passage 130, while illustrated as being adjacent to the pressure sidewall 96, can alternatively be positioned adjacent to the suction sidewall 98.

The near wall cooling circuit 132 comprises a plenum passage 136, extending from the tip 80 to the root 82, and can have a plurality of pins or pin banks 138 disposed within the plenum passage 136. The near wall cooling circuit 132 further comprises at least one return passage 140, illustrated in FIG. 4 as two return passages 140 located on opposite ends of the plenum passage 136. The return passages 140 fluidly couple to the plenum passage 136 near the root 82, and extend from the root 82 to the tip 80.

The leading edge cooling circuit 120 has a leading edge passage 144, being located adjacent to the leading edge 100 and extending from the root 82 to the tip 80. The leading edge passage 144 is in fluid communication with the supply passage 130 through a lead circuit channel 146 defined in a wall 148 between the supply passage 130 and the leading edge passage 144. The lead circuit channel 146 can comprise multiple discrete inlets, such as impingement openings which can be of various sizes and shapes. The leading edge passage 144 can further be adjacent to one return passage 140 of the near wall cooling circuit 132.

The mid cooling circuit 122 is disposed in the chordial middle of the airfoil 78 relative to the position of the leading edge cooling circuit 120 and the trailing edge cooling circuit 124, being adjacent to the leading edge 100 and the trailing edge 102, respectively. The mid cooling circuit 122 can fluidly couple to the second inlet passage 90, receiving a flow of cooling fluid therefrom. The mid cooling circuit 122 comprises a supply passage 160, fluidly coupled to the second inlet passage 90, and extends from root 82 to tip 80. The supply passage 160 can be located adjacent to the suction sidewall 98, or can be adjacent the pressure sidewall 96, or neither adjacent to the pressure nor suction sidewalls 96, 98.

The mid supply passage 160 fluidly couples to a mid plenum passage 162 extending from tip 80 to root 82. The mid plenum passage 162 further couples to a mid return passage 164, being disposed between the combination of the mid supply passage 160 and the mid plenum passage 162, and the leading edge cooling circuit 120. In addition to the mid return passage 164, the mid plenum passage 162 further fluidly couples to a near wall cooling mesh 166 located on the pressure side between the pressure sidewall 96 and the mid plenum passage 162. The near wall cooling mesh 166 comprises a channel 168 having a plurality of pins or a pin bank 170 disposed within the channel 168. The near wall cooling mesh 166 is in further fluid communication with a mesh plenum 172 located on an opposite end of the channel 168 relative to where the mid plenum passage 162 fluidly couples to the channel 168.

The trailing edge cooling circuit 124, comprising the first cooling circuit 124*a* and the second cooling circuit 124*b*, can be commonly fed from the third inlet passage 92. The third inlet passage 92 can feed both the first cooling circuit 124*a* and the second cooling circuit 124*b* where the third inlet passage 92 can split from one inlet into two inlets within the dovetail 76. In an alternative embodiment, a fourth inlet passage (not shown) can be used to feed one of the first cooling circuit 124*a* or the second cooling circuit 124*b* while the third inlet passage 92 feeds the other. The second cooling circuit 124*b* is disposed adjacent to the trailing edge 102 and the first cooling circuit 124*a* is disposed chordially between the second cooling circuit 124*b* and the mid cooling circuit 122.

The first cooling circuit 124*a* comprises a supply passage 180, being in fluid communication with the third inlet passage 92, and extending from the root 82 to the tip 80. The supply passage 180 fluidly couples to a return passage 182 extending form the tip 80 to the root 82, which fluidly couples to an outlet passage 184 extending from the root 82 to the tip 80.

The second cooling circuit 124*b* comprises a supply passage 190, being in fluid communication with the third inlet passage 92 and extending from the root 82 to the tip 80. The supply passage 190 fluidly communicates with a trailing edge passage 192, extending from root 82 to tip 80. In one example, the trailing edge passage 192 can be coupled to the supply passage 190 through one or more inlets 194 extending radially along the airfoil 78, disposed between the supply and trailing edge passages 190, 192. The trailing edge passage 192 can be disposed with one or more rows of pins or pin banks 196 disposed within the trailing edge passage 192. The trailing edge passage 192 can further comprise one or more slots in fluid communication with the trailing edge passage 192 and the exterior of the airfoil 78.

It should be appreciated that the geometry as illustrated in FIG. 3 is exemplary of one implementation of the cooling circuits disclosed herein and should not be understood as limiting. The cooling circuits comprising a plurality of passages, walls, channels, pin banks, etc. should be understood as one exemplary implementation of the cooling circuits within an airfoil 78, and the positions, dimensions, and geometries disclosed herein are incorporated in order to facilitate understanding of the inventive concept of the cooling circuits. For example, the near wall cooling circuit 132, while shown on the suction sidewall 98 of the airfoil 78, can alternatively be located on the pressure sidewall 96. Similarly, any of the illustrated near wall cooling circuits can be located on the opposite side as illustrated. The number of near wall cooling circuits can be increased and located on both sides. Furthermore, the abstract shapes defined by the passages within the cross-sectional profile of the airfoil 78 are exemplary and can be any shape, geometrical, unique, or otherwise.

It should be further appreciated that the near wall cooling passages, while illustrated as being relatively large, can be very small, such that the near wall cooling passages have a much smaller cross-sectional area as compared to the cross-sectional area illustrated in the figures.

Figure 5:
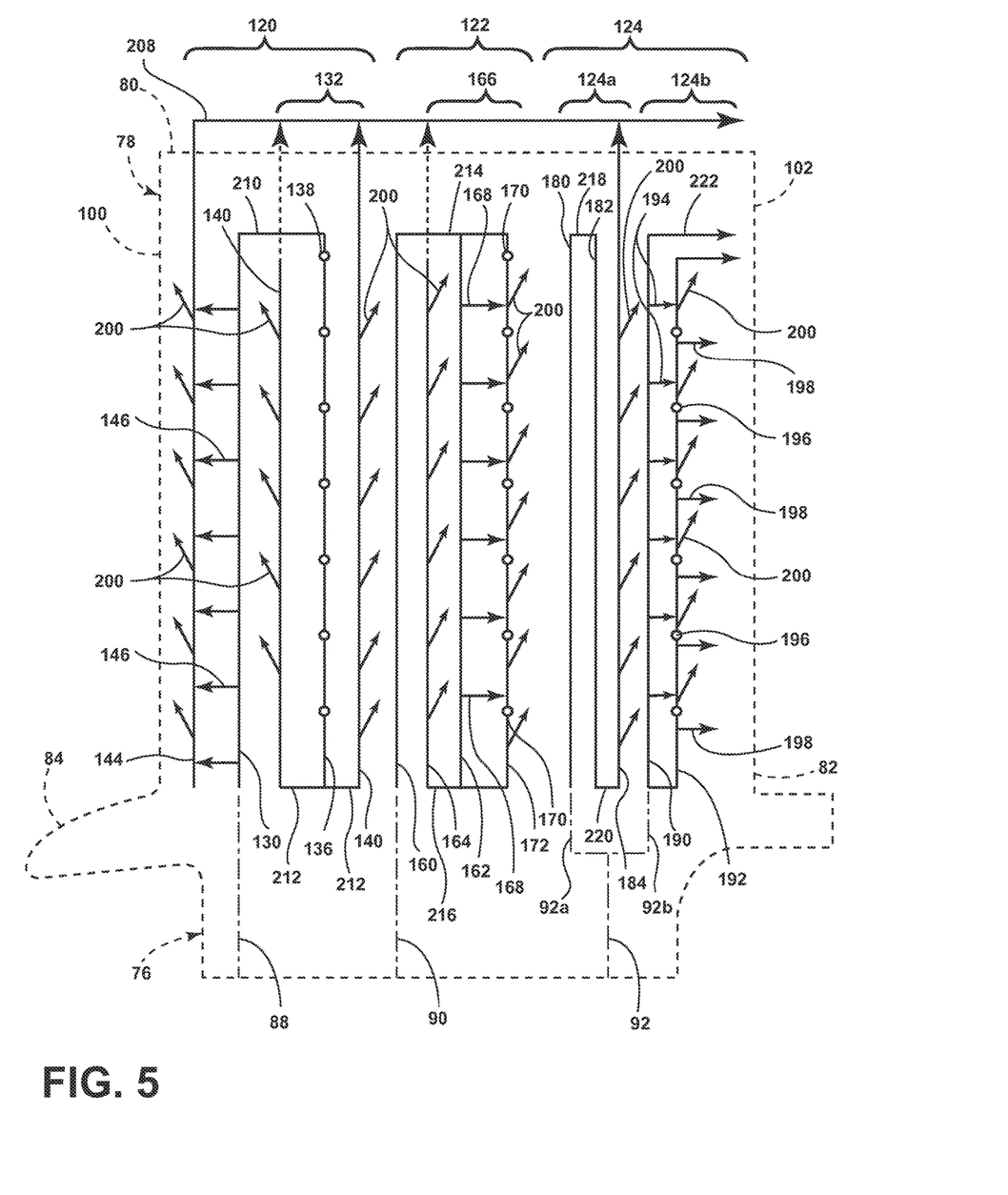
FIG. 5 is a flow diagram for the cooling circuits of the airfoil of FIG. 4.

FIG. 5 is a flow diagram for the cooling circuits 120, 122, 124 of the airfoil 78 of FIG. 4. The airfoil 78 is schematically shown in broken line to illustrate the general configuration of the cooling circuit 120, 122, 124 within the airfoil 78. The airfoil 78 defines an airfoil cavity extending from the leading edge 100 to the trailing edge 102 in a chordwise direction and from the tip 80 to the root 82 in a spanwise direction, and which can be divided into distinct channels or passages by internal walls to form the cooling circuits 120, 122, 124, which direct a flow of cooling fluid through the airfoil 78. A tip cooling passage 208, disposed above the tip 80 of the airfoil 78, can extend in a substantially chordwise direction from near the leading edge 100 toward the trailing edge 102. The tip cooling passage 208 provides a common passage for the cooling circuits 120, 122, 124 to exhaust a cooling fluid, such that cooling fluid fed into the cooling circuits 120, 122, 124 can be eventually exhausted from the airfoil 78 if not being exhausted through one or more film holes.

The leading edge cooling circuit 120 can be fed with the cooling fluid from the first inlet passage 88 within the dovetail 76. The leading edge cooling circuit 120 receives the cooling fluid within the supply passage 130 moving from the root 82 toward the tip 80. The supply passage 130 fluidly communicates with the leading edge passage 144 through the lead circuit channel 146 where a plurality of film holes 200 can exhaust the cooling fluid along the leading edge of the airfoil 78 to create a cooling film.

The leading edge cooling circuit 120 can further include at least one upper turn 210 near the tip 80, providing cooling fluid to the near wall cooling circuit 132 from the supply passage 130. At the upper turn 210, the cooling fluid can flow from the supply passage 130 into plenum passage 136. The cooling fluid travels within the plenum passage 136, comprising multiple pins 138, in a tip 80 to root 82 direction. Near the root 82, the leading edge cooling circuit 120 can further comprise at least one lower turn 212, exemplarily illustrated as two lower turns 212, providing cooling fluid from the plenum passage 136 to the return passages 140. The cooling fluid flows within the return passages 140 in a root 82 to tip 80 direction, and can exhaust the cooling fluid through the film holes 200 to form a cooling film along the airfoil 78 exterior surface.

The mid cooling circuit 122, disposed chordially between the leading edge cooling circuit 120 and the trailing edge cooling circuit 124, can be fed with a flow of cooling fluid from the second inlet passage 90. The mid cooling circuit 122 receives the cooling fluid within the supply passage 160 from the second inlet passage 90, moving from the root 82 toward the tip 80. The mid cooling circuit 122 further comprises an upper turn 214 where the supply passage 160 fluidly communicates with the mid plenum passage 162. The mid plenum passage 162 is further in fluid communication with the near wall cooling mesh 166 through the channel 168 from the mid plenum passage 162. The cooling airflow can move through the near wall cooling mesh 166, which can include one or more pins or pin banks 170, to the mesh plenum 172, where the cooling fluid can be exhausted through the film holes 200 to create a cooling film along the outer surface of the airfoil 78.

The mid cooling circuit 122 can further comprise a lower turn 216, providing cooling fluid to the mid return passage 164 from the mid plenum passage 162. From the mid return passage 164, the film holes 200 can exhaust the cooling fluid from the mid cooling circuit 122 to provide a cooling film along the exterior surface of the airfoil 78. As the mid return passage 164 can extend between the suction and pressure sidewalls 96, 98, one or more sets of film holes 200 can provide a cooling fluid flow to the exterior surface of the airfoil 78.

The trailing edge cooling circuit 124 can be fed with a flow of cooling fluid from the third inlet passage 92. The third inlet passage 92, can further supply the first cooling circuit 124a and the second cooling circuit 124b individually, which can be done by separating the cooling fluid flow from the third cooling inlet 92 into a leading side inlet 92a and a trailing side inlet 92b.

The first cooling circuit 124a, illustrated as being fed from the leading side inlet 92a, receives a cooling fluid flow within the supply passage 180 in a root 82 to tip 80 direction. At an upper turn 218, the cooling fluid can be provided to the return passage 182 from the supply passage 180, moving in a tip 80 to root 82 direction. The cooling fluid can then be provided to the outlet passage 184 from the return passage 182, at a lower turn 220 moving from root 82 to tip 80. Within the outlet passage 184, the cooling fluid can be exhausted through the film holes 200 to provide a cooling film along the exterior surface of the airfoil 78. Thus, the fluid path defined by the first cooling circuit 124a can be substantially serpentine, snaking between the tip 80 and the root 82.

The second cooling circuit 124b, illustrated as being fed from the trailing side inlet 92b, can be provided with a flow of cooling fluid in the supply passage 190 in a root 82 to tip 80 direction. Along the supply passage 190, cooling fluid can flow into a trailing edge passage 192, which can comprise one or more pins 196, through one or more inlets 194 from the supply passage 190. Cooling fluid, which does not flow into the trailing edge passage 192, can be exhausted from the tip end 222 of the supply passage out the trailing edge 102 of the airfoil 78.

Cooling air within the trailing edge passage 192 can be exhausted from the airfoil 78 through the film holes 200, or can alternatively be exhausted through the trailing edge 102 through the slots 198.

It should be appreciated that cooling circuits 120, 122, 124, as illustrated in FIG. 4 are exemplary of one implementation of the cooling circuits within an airfoil 78 and should not be construed as limited by the particular geometry, passages, pin banks, film holes, etc. It should be further understood that while the cooling circuits 120, 122, 124, 124a, 124b are illustrated as generally moving from the leading edge 100 toward the trailing edge 102 or the trailing edge 102 toward the leading edge 100, the illustration is only an exemplary depiction of the cooling circuits themselves. The particular passages, channels, inlets, or mesh can flow in any direction relative to the airfoil 78, such as in the trailing or leading edge 102, 100 direction, tip 80 or root 82 direction, or toward the pressure or suction sidewalls 96, 98 of the airfoil 78, or any combination thereof.

The various embodiments of systems, methods, and other devices related to the invention disclosed herein provide improved cooling effectiveness for the cooling circuit of a turbine blade. One advantage that may be realized in the practice of some embodiments of the described systems is that the cooling circuits of the blade can be utilized to at least one of pressure or suction sidewalls of the blade, and more preferably on both sidewalls, while providing air to the film holes in order to create a cooling film on the external surface of the airfoil. The implemented cooling circuits provide optimal cooling and airflow management within an airfoil, in order to maintain effective engine operation at heightened temperatures, increasing engine efficiency and lifetime. While the specific embodiments are described in terms of an airfoil in the form of a turbine blade, the description is equally applicable to any airfoil within the gas turbine engine, including, without limitation, turbine vanes, compressor blades and compressor vanes.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:

an outer surface defining a pressure side and a suction side extending axially between a leading edge and a trailing edge and extending radially between a root and a tip; and a leading edge cooling circuit located within the airfoil and comprising:
   a supply passage extending from the root toward the tip and fluidly coupled to an inlet passage at the root,
   a near wall cooling circuit located along the outer surface and having a plenum passage fluidly coupled to the supply passage and extending from the tip toward the root, and first and second return passages extending from the root toward the tip and fluidly coupled to the plenum passage, and
   a leading edge passage adjacent the leading edge, extending in a root to tip direction and fluidly coupled to the supply passage;
wherein cooling fluid is supplied through the inlet passage to the supply passage where it flows directly from the supply passage into both the plenum passage and the leading edge passage, and a flow of cooling fluid from the plenum passage splits so that some of the cooling fluid from the plenum passage flows into the first return passage and other of the cooling fluid from the plenum passage flows into the second return passage.

2. The airfoil according to claim 1 wherein the near wall cooling circuit is located adjacent one of the pressure side or suction side.

3. The airfoil according to claim 1 wherein at least one of the first and the second return passages is proximate to the leading edge passage.

4. The airfoil according to claim 1 wherein the supply passage is spaced from the one of the pressure side or suction side by the near wall cooling circuit.

5. The airfoil according to claim 4 wherein the supply passage is adjacent the suction side.

6. The airfoil according to claim 1 wherein at least one of the first and the second return passages is adjacent the leading edge passage.

7. The airfoil according to claim 1 wherein the cooling fluid from the plenum passage splits near the root of the airfoil.

8. The airfoil according to claim 1 wherein the plenum passage is located between the first and second return passages.

9. The airfoil according to claim 1 further comprising film holes passing through the outer surface and into at least one of the leading edge passage and the first and the second return passages.

10. The airfoil according to claim 1 wherein the airfoil comprises at least one of a blade or vane for a compressor or turbine.

11. A blade for a gas turbine engine having a turbine rotor disk, the blade comprising:
   a dovetail having at least one cooling fluid inlet passage and configured to mount to the turbine rotor disk;
   an airfoil extending radially from the dovetail and having an outer surface defining a pressure side and a suction side extending axially between a leading edge and a trailing edge and extending radially between a root and a tip, with the root being adjacent the dovetail; and
   a leading edge cooling circuit located within the airfoil and comprising:
      a supply passage extending from the root toward the tip and fluidly coupled to an inlet passage at the root,
      a near wall cooling circuit located along the outer surface and having a plenum passage fluidly coupled to the supply passage and extending from the tip toward the root, a first return passage extending from the root toward the tip and fluidly coupled to the plenum passage, a second return passage extending from the root toward the tip and fluidly coupled to the plenum passage, with the plenum passage located between the first and second return passages, and
      a leading edge passage adjacent the leading edge, extending in a root to tip direction and fluidly coupled to the supply passage;
   wherein cooling fluid is supplied through the inlet passage to the supply passage, where it flows directly from the supply passage into both the plenum passage and the leading edge passage, and a flow of cooling fluid from the plenum passage splits so that some of the cooling fluid from the plenum passage flows into the first return passage and other of the cooling fluid from the plenum passage flows into the second return passage.

12. The blade according to claim 11 wherein the near wall cooling circuit is adjacent the suction side.

13. The blade according to claim 12 wherein the supply passage is spaced from the suction side by the near wall cooling circuit and is adjacent the pressure side.

14. The blade according to claim 13 further comprising film holes passing through the outer surface and into the leading edge passage and at least one of the first and second return passages.

15. The blade according to claim 14 further comprising impingement openings fluidly coupling the supply passage to the leading edge passage.

16. The blade according to claim 15 further comprising pins located within the plenum passage.

17. The blade according to claim 11 wherein the dovetail further comprises a second cooling fluid inlet passage, and the blade further comprises a trailing edge cooling circuit located within the airfoil and having a trailing edge supply passage fluidly coupled to the second cooling fluid inlet passage, and trailing edge slots fluidly coupled to the trailing edge supply passage.

18. The blade according to claim 17 wherein the dovetail further comprises a third cooling fluid inlet passage, and the blade further comprises a mid cooling circuit located within the airfoil between the leading edge cooling circuit and the trailing edge cooling circuit, and having a near wall cooling mesh located along the outer surface.

19. The blade according to claim 18 wherein the near wall cooling mesh is located along the pressure side.

20. The blade according to claim 19 further comprising a pin bank located within the near wall cooling mesh.

21. An airfoil for a gas turbine engine comprising
   an outer surface extending axially between a leading edge and a trailing edge and extending radially between a root and a tip, and
   a leading edge cooling circuit located within the airfoil adjacent the leading edge and comprising
      a supply passage extending from the root toward the tip,
      a near wall cooling circuit located along the outer surface and between the outer surface and the supply passage, and the near wall cooling circuit having a plenum passage fluidly coupled to the supply passage and extending from the tip toward the root, and first and second return passages extending from the root toward the tip and fluidly coupled to the plenum passage, and a leading edge passage adjacent the leading edge, extending in a root to tip direction and fluidly coupled to the supply passage, wherein cooling fluid is supplied through the supply passage, where it flows directly from the supply passage into both the plenum passage and the leading edge passage, and a flow of cooling fluid from the plenum passage splits so that some of the cooling fluid from the plenum passage flows into the first return passage and other of the cooling fluid from the plenum passage flows into the second return passage.

\* \* \* \* \*